(12) United States Patent
Oesingmann

(10) Patent No.: US 7,245,752 B2
(45) Date of Patent: Jul. 17, 2007

(54) METHOD, TOMOGRAPHY APPARATUS AND SOFTWARE PRODUCT FOR EVALUATION OF TIME-VARYING DIAGNOSTIC PROCEDURES

(75) Inventor: Niels Oesingmann, Buckenhof (DE)

(73) Assignee: Siemens Aktiengesellschaft, Munich (DE)

( * ) Notice: Subject to any disclaimer, the term of this patent is extended or adjusted under 35 U.S.C. 154(b) by 950 days.

(21) Appl. No.: 10/439,064

(22) Filed: May 15, 2003

(65) Prior Publication Data
US 2004/0002646 A1 Jan. 1, 2004

(30) Foreign Application Priority Data
May 15, 2002 (DE) .................................. 102 21 643

(51) Int. Cl.
*G06K 9/00* (2006.01)
(52) U.S. Cl. ..................... 382/128; 382/131; 382/132
(58) Field of Classification Search ................ 382/128, 382/130, 131, 132, 274, 275
See application file for complete search history.

(56) References Cited

U.S. PATENT DOCUMENTS

| 4,551,800 | A | | 11/1985 | Riederer et al. | |
|---|---|---|---|---|---|
| 5,233,990 | A | * | 8/1993 | Barnea | 600/427 |
| 5,483,960 | A | * | 1/1996 | Steiger et al. | 600/425 |
| 5,690,106 | A | | 11/1997 | Bani-Hashemi et al. | |
| 5,828,720 | A | * | 10/1998 | Syrjanen | 378/38 |
| 6,002,959 | A | * | 12/1999 | Steiger et al. | 600/425 |
| 6,628,978 | B1 | * | 9/2003 | Kondo et al. | 600/409 |

FOREIGN PATENT DOCUMENTS

| DE | OS 199 45 018 | 4/2001 |
|---|---|---|
| EP | 0 635 727 | 1/1995 |
| EP | 0 952 547 | 10/1999 |

OTHER PUBLICATIONS

"Motion Detection and Motion Compensation For Digital Subtraction Angiography Image Enhancement," Buzug et al, Philips J. Res. vol. 51 (1998) pp. 203-239.

(Continued)

*Primary Examiner*—Yosef Kassa
(74) *Attorney, Agent, or Firm*—Schiff Hardin LLP

(57) ABSTRACT

In a method, tomography apparatus and software product for evaluating time varying diagnostic images, a series of images are obtained in a time sequence from an examination subject in a tomography system, the sequence including exposures in a first image dataset obtained before occurrence of a diagnostically relevant event associated with the subject, and a second image dataset obtained at or after the event. A first correction of the image data is undertaken by displacing the image contents in each image to bring the position of the subject in each image into coincidence. A second correction of the image data is undertaken by obtaining an average value image from the image data corrected by the first correction. All of the images in the first and second datasets, corrected by the first correction, are normalized to the average value image on a picture element-by-picture element basis. A third correction is undertaken wherein the value of a picture element of a structurally uniform image region in an image in the first image dataset, corrected according to the second correction, or an average of picture elements in this image region in the first image dataset, is subtracted from the respective values of all picture elements in this region in the first and second image datasets.

9 Claims, 3 Drawing Sheets

OTHER PUBLICATIONS

"Digital Image Processing," Gonzalez et al, Nov. 9, 2001, pp. 116-123.

"Digital Image Processing," Gonzalez et al., (1992) pp. 185-189, 583-586.

* cited by examiner

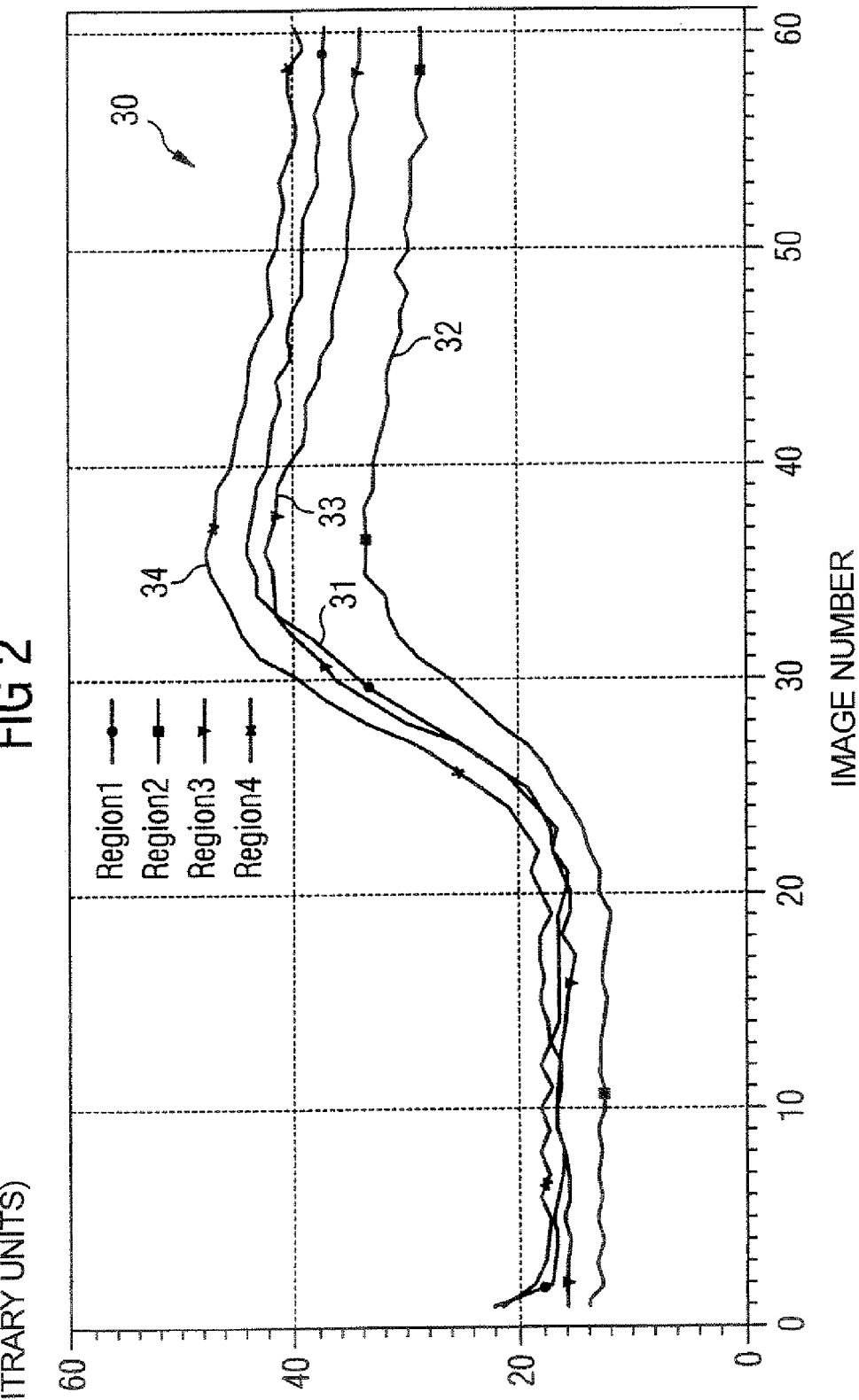

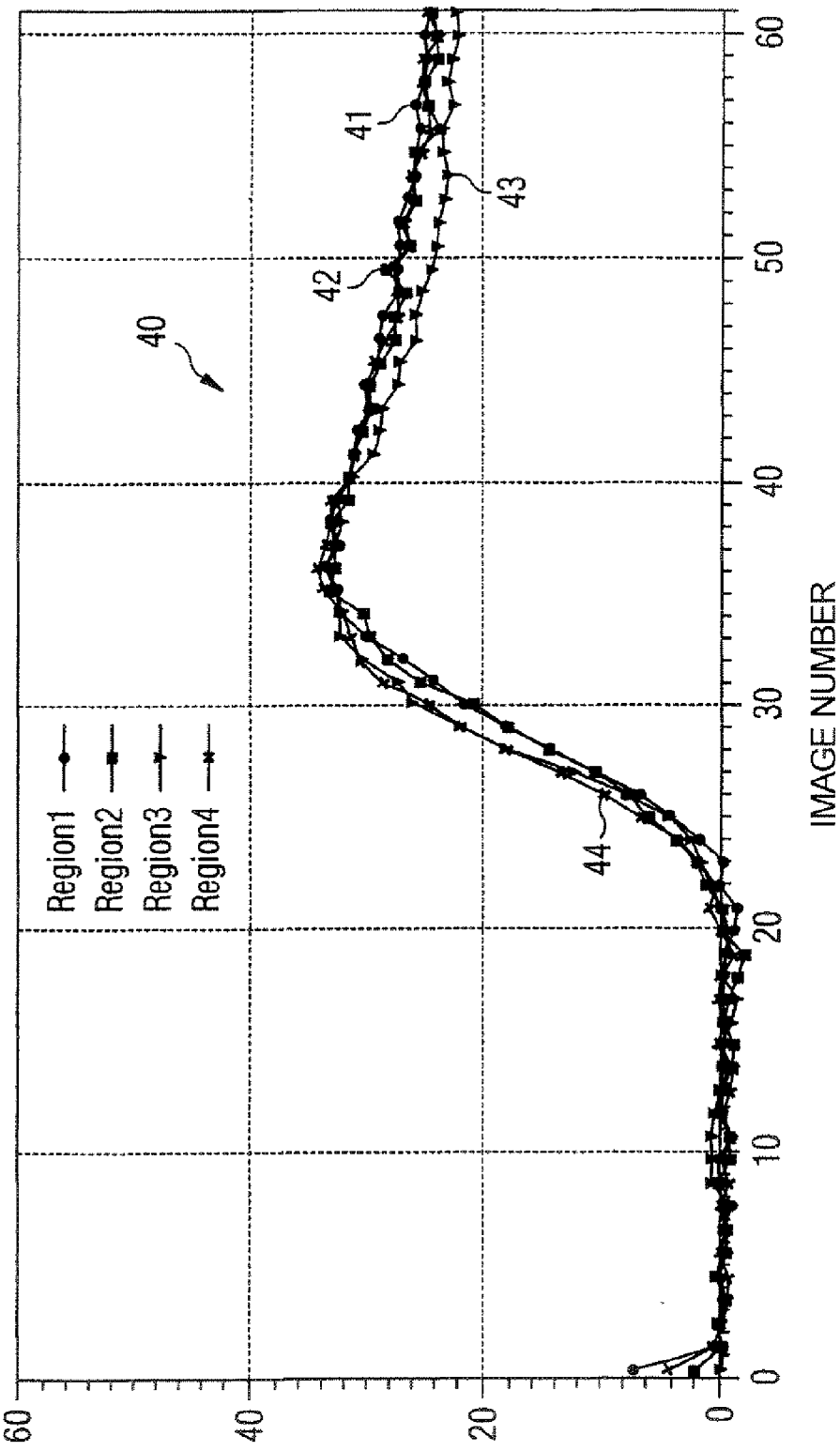

METHOD, TOMOGRAPHY APPARATUS AND SOFTWARE PRODUCT FOR EVALUATION OF TIME-VARYING DIAGNOSTIC PROCEDURES

BACKGROUND OF THE INVENTION

1. Field of the Invention

The present invention relates to medical and diagnostic imaging, in particular the evaluation of medical image data sets in relation to the variation over time of changes which have been caused by diagnostic preparations (administered substances) in a region under examination.

2. Description of the Prior Art

The meaningfulness of an examination of the propagation of a diagnostic preparation, such as a contrast agent or a radiopharmaceutical, in an organ or a region of the body of a patient, using magnetic resonance tomography or scintillography, is adversely affected by various influences. An appropriate examination is carried out by using a sequence of measurements, which supplies exposures of the region under examination for various successive times. For an assessment of possible pathological changes, the changes in image intensity effected by the diagnostic preparation must be evaluated exactly from the image data of the series of exposures produced in such a way.

In general, reliable evaluation of the image intensity changes caused by a diagnostic preparation is made more difficult by three influences.

A first influence is the deformation and displacement of organs in the body because of bodily functions, such as the beating of the heart or breathing. Therefore, the times at which an image is obtained generally are synchronized with a defining bodily function in a measuring sequence. For example, during a perfusion measurement of the heart, the ECG signal is used to synchronize the recordings with the beat cycle of the heart. As a result, each individual recording in the measuring sequence is always obtained in the same state of deformation (phase) of the heart. However, since breathing follows a different cycle from that of the heart, there is a displacement of the heart or its representation in the individual recordings. In general, this means that the same regions of an organ under examination or a bodily region under examination are depicted at different positions in the individual images of a series of exposures. The determination of the position of a body region to be examined in an image therefore cannot be transferred to other images in the series of exposures.

In order to prevent a movement of an organ, caused by breathing, making the evaluation of the image data of a series of exposures more difficult or even impossible, the series of exposures of a measuring sequence is often carried out with the patient holding his or her breath. This necessitates great stress on the patient during the corresponding measuring sequence, as a result of which in turn an untrue stressed situation of the patient can be produced.

Furthermore, the evaluation is influenced by the characteristics of the detectors used to produce the image data. In particular, changing the sensitivity of a detector with the distance and/or direction to the object to be measured makes it more difficult to compare the measured data or the image intensities provided thereby from different positions of the region under examination. For example, in magnetic resonance tomography, identical tissues exhibit different intensities depending on the distance from the detector (reception) coil. The intensity in this case decreases with increasing distance from the coil.

If, therefore, a tissue close to the detector coil is compared with a tissue which is located at some distance from the detector coil, and if both tissues contain the same concentration of a diagnostic preparation, then the preparation results in a higher image intensity in the tissue close to the coil than the tissue remote from the coil.

A correct assessment is very difficult to carry out visually for these measurement-induced signal changes, as well as because the measured signal intensities are also influenced by the magnetic characteristics of the tissue itself, in addition to the imaging characteristics of the detector coil or the measuring system.

There are similar conditions in scintillography, wherein the measured image intensities are composed of the imaging characteristics of the gamma camera and the enrichment of the radiopharmaceutical in the tissue.

Furthermore, the image intensity or the value of the image elements of a body region in the image data set of an exposure from a measuring sequence is composed of a contribution from the tissue of this body region itself and a contribution from the concentration of the diagnostic preparation in this tissue at the time of the exposure, so that it is not possible to use the image intensity to make conclusions about the concentration of the diagnostic preparation.

SUMMARY OF THE INVENTION

It is an object of the present invention to prepare the image data from a measuring sequence for examining the variation over time of changes which are produced by the introduction of a diagnostic preparation into a region under examination in such a way so as to allow reliable assessment of these changes.

This object is achieved in a method, a tomography apparatus, and a computer software product accordance with the independent claims of the invention.

In the inventive method for correcting image data, exposures of a sequence of measurements are obtained from an examination subject in a time sequence by a medical diagnostic imaging system including a first image data set of the sequence obtained before the occurrence of a diagnostically relevant event, and at least a second image data set of the sequence obtained at and/or after the occurrence of the diagnostically relevant event. A first correction is made to the image data by displacing the image contents in the depictions of the measuring sequence, so that the respective positions of the examination subject in all the images are brought substantially into coincidence. A second correction is made to the image data by forming an average image from the corrected first image data set, and all the images of the corrected first and second image data sets are normalized, image element by image element, to the calculated average image. A third correction is made to the measured data, by subtracting the value of an image element from a structurally uniform image region of an image of the first image data set corrected by the second correction, or an average of image elements from this image region in the first image data set, from the values of all the image elements of this region in the first and second image data sets.

The correction method according to the invention eliminates, in a straightforward way, the contributions of the disruptive factors described above from the exposures of a measuring sequence, so that reliable assessment of the variation over time of the propagation of a diagnostic preparation in the region under examination is made possible.

The inventive medical diagnostic imaging system operating according to the inventive method is preferably a system for magnetic resonance tomography or a scintillography system. The inventive computer software product operates a data processing system for processing tomographic data in the manner described above.

In order, with little effort, to achieve an adaptation of the position of the object under examination in the various images of the sequence, the first correction to the image data is accomplished using a correlation analysis.

DESCRIPTION OF THE DRAWINGS

FIG. 2 shows, in a graph, the course over time of the image intensities of four different regions of a myocardium of an examination subject during a perfusion measurement.

FIG. 3 shows, in a graph, the course over time, corrected according to the invention, of the image intensities of these four different regions of the myocardium during the same perfusion measurement.

DESCRIPTION OF THE PREFERRED EMBODIMENTS

Figure 1:
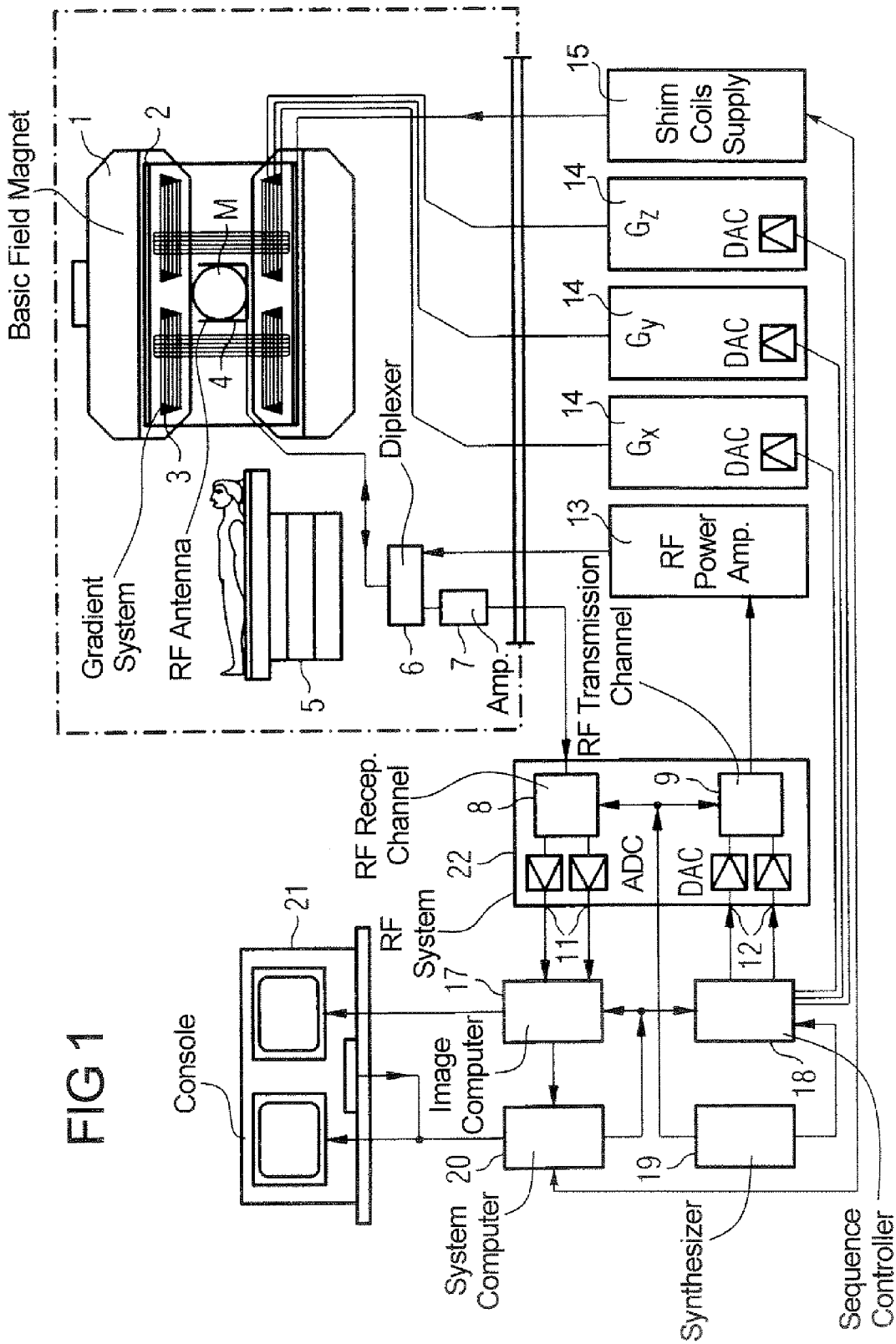
FIG. 1 is a schematic illustration of a magnetic resonance tomography device according to the invention.

In a diagnostic modality, such as magnetic resonance tomography, a visualization of the interior of the body region being examined is obtained.

FIG. 1 is a schematic illustration of a magnetic resonance imaging (tomography) device for producing a magnetic resonance image of an object according to the present invention. The basic components of the tomography device correspond to those of a conventional tomography device, with the differences described below. A basic field magnet 1 produces a time-constant strong magnetic field for the polarization and alignment of nuclear spins in the region under examination of an object, such as a part to be examined of a human body. The high homogeneity of the basic magnetic field, required for the magnetic resonance measurement, is defined in a measuring volume M, for example a spherical measuring volume, into which the part of the human body to be examined is introduced. In order to satisfy the homogeneity requirements and, in particular, to eliminate time-invariable influences, shim plates of ferromagnetic material are fitted at suitable locations. Time-variable influences are eliminated by shim coils 2, which are driven by a shim power supply 15.

Inserted into the basic field magnet 1 is a cylindrical gradient coil system 3, which has three windings or coils. Each winding is supplied by an amplifier 14 with current for producing a linear gradient field in the respective direction of the Cartesian coordinate system. The first winding of the gradient field system 3 in this case produces a gradient $G_x$ in the x-direction, the second winding produces a gradient $G_y$ in the y-direction, and the third winding produces a gradient $G_z$ in the z-direction. Each amplifier 14 includes a digital-analog converter, which is driven by a sequence controller 18 in order to produce gradient pulses at the correct time.

Within the gradient field system 3 there is a radio-frequency antenna 4, which converts the radio-frequency pulses emitted by a radio-frequency power amplifier into an alternating magnetic field for exciting the nuclei and aligning the nuclear spins of the object under examination or of the region of the object under examination. The radio-frequency antenna 4 includes one or more RF transmitter coils and one or more RF receiver coils, possibly in the form of an array of component coils (general designation "coil arrays" or else "phased array coils"). The RF receiver coils of the radio-frequency antenna 4 also convert the alternating field originating from the processing nuclear spins (as a rule the nuclear spin echo signals) brought about by a pulse sequence containing one or more radio-frequency pulses and one or more gradient pulses, into a voltage which is supplied via an amplifier 7 to a radio-frequency reception channel 8 of a radio-frequency system 22. The radio-frequency system 22 further includes a transmitting channel 9, in which the radio-frequency pulses for excitation of the nuclear spins are produced. In this case, the respective radio-frequency pulses are represented digitally as a sequence of complex numbers in the sequence controller 18 on the basis of a pulse sequence predefined by the system computer 20. This numerical sequence is fed as a real part and an imaginary part, in each case via an input 12, to respective digital-analog converters in the radio-frequency system 22, and from the latter to the transmission channel 9. In the transmission channel 9, the pulse sequences are modulated onto a radio-frequency carrier signal, having basic frequency corresponding to the resonant frequency of the nuclear spins in the measurement volume.

The changeover from transmitting mode to receiving operation is carried out via a transmission reception diplexer 6. The RF transmitting coil of the high frequency antenna 4 radiates the radio-frequency pulses for exciting the nuclear spins into the measurement volume M and scans the resultant echo signals via the RF receiving coils. The obtained nuclear magnetic resonance signals are demodulated in a phase-sensitive manner in the reception channel 8 of the radio-frequency system 22 and are converted by respective analog-digital converters into the real part and imaginary part of the measured signal. In an image computer 17, the measured data obtained in this way are used to reconstruct an image. The management of the measured data, the image data and the control programs is carried out by the system computer 20. On the basis of designated control programs, the sequence controller 18 controls the production of the desired pulse sequences and the corresponding scanning of k-space. In particular, the sequence controller 18 controls the switching of the gradients, the emission of the radio-frequency pulses with defined phase and amplitude and the reception of the nuclear resonance signals at the correct time. The time base (clock) for the radio-frequency system 22 and the sequence controller 18 is provided by a synthesizer 19. The selection of appropriate control programs for producing a magnetic resonance image and the display of the image are carried out via a console 21, which has a keyboard and one or more monitors. The console 21 also is used for image evaluation according to the invention.

The intensity of an image element in the magnetic resonance tomogram is determined by the characteristics of the imaged tissue and the characteristics of the measuring system. The image intensity can be increased by the addition of contrast agents. Such a contrast agent technique is used in particular in perfusion measurements of organs such as the heart. In this case, the contrast agent, administered to a patient by means of an injection, passes via the blood circulation, within a certain time interval, to the organ under examination, where it is distributed until it is ultimately slowly eliminated from the body again.

In the course of a perfusion measurement of the myocardium, the course over time of the penetration of the contrast agent into the various heart muscle regions is observed. For this purpose, within the context of a measuring sequence, beginning at a time shortly before or with the administration of the contrast agent, a number of exposures of the heart is obtained in a time sequence. Once the contrast agent penetrates into the heart muscle, the intensity of the image element relating to this heart muscle increases in the respective images.

During a perfusion measurement, the increase in intensity brought about by the contrast agent in the depiction of a tissue region is followed over time. For the purpose of evaluation, the intensity values of the image points from this tissue region are plotted as a function of time or, in an analogous manner, over the sequence of depictions from the sequence of measurements. Such an evaluation is presented in FIG. 2.

FIG. 2 shows the changes caused over time in the image intensities of four different tissue regions (Region1 designated●, Region2 designated ■, Region3 designated y, and region 4 designated x) of a heart muscle with inconspicuous myocardial tissue during a perfusion measurement with addition of contrast agent. The distances between the tissue regions and the detector coil are different, Region2 (■) being furthest removed from the coil.

The position and extent of the individual tissue regions are defined in the pictorial representations of a measured sequence. The image intensity of a tissue region defined in this way is determined in each depiction in the measured sequence and plotted against the image number in the graph of FIG. 2.

Due to the displacement in the position of the defined tissue regions in the individual recordings, caused by the movement of the examination subject during the measurements, the position of the region of interest in each exposure must be determined independently of the others. According to the invention, therefore, a movement correction is carried out before the determination of the intensity values of the individual regions.

To this end, the position of the depiction of the examination subject in all the images in a measured sequence is corrected so that the depiction of the object in the images assumes the same position. This can be implemented, for example, by means of a correlation analysis of the images in the series of recordings. The image region used for the correlation analysis can in this case be the entire image, a part thereof or disjunctive image regions of the overall image. The result of the movement correction is a series of depictions with images in which a tissue region is always located at the same position.

By means of the movement correction, the determination, applicable to all the images in the series of depictions, of the geometric impression and the position of a tissue region from only one image in the series is made possible. For the graph of FIG. 2, the image intensity values are read out separately for a specific tissue region from the images and plotted in the order of the exposures.

The time-varying value of a measured signal $S_i(t)$ from a tissue region i as a function of the time t is composed of a time-independent signal contribution $S_i^0$ of the original tissue and a time-varying signal contribution $\Delta S_i(t)$ of a tissue change and a noise component $S_n$. The conversion of a measured signal $S_i$ from a tissue region i into an image intensity $B_i$ undergoes weighting $k_i$ by the detector used, so that the image intensity $B_i$ from a depicted region is calculated as $$B_i(t)=k_i \cdot (S_i^0+\Delta S_i(t))+S_n \quad (1)$$

For a meaningful analysis, the noise component must have no deterministic influence on the image intensity $B_i$ and will therefore be disregarded in the following text.

As long as no contrast agent penetrates into the tissue under examination during a perfusion measurement, the image intensity in the tissue depiction does not change. Once the injected contrast agent reaches the tissue and is propagated therein, the intensity of the tissue increases over time until, as a result of the contrast agent being eliminated from the tissue, the image intensity values decrease slowly again to the original time-independent value. The time-dependent contribution to the image intensity is therefore a measure of the concentration of the contrast agent in the tissue under examination.

In order to eliminate the influence of the geometry-dependent sensitivity or weighting factors $k_i$ on the image intensity of a tissue region i, in the following second correction step, all the depictions from the measured sequence are normalized to an average image.

To this end, the images in which the time-varying signal changes $\Delta S_i(t)$ still do not make any contribution to the image intensity $B_i(t)$ are first determined. In other words, a selection is made of images from the series of exposures before the contrast agent arrives in one of the tissue regions i. From this selection, an average image is determined, for example by a search being made for an image representing the selection or the average image being calculated, for example, on the basis of arithmetic or quadratic averaging, image element by image element, from a number of images in the selection. In general, all the images in the selection are used. In order to obtain optimal results, images with a comparatively high noise component can be removed from the averaging. The selection of a representative image as an average image can be based, for example, on criteria such as a low noise component $S_n$ and/or the smallest possible change in the image content during the preceding movement correction. This average image thus corresponds to an average depiction of the object under examination subject before the first arrival of the contrast agent.

Next, all the depictions of the measured sequence are normalized to this average image by, at the level of the individual image elements, the image intensities of the movement-corrected depictions being divided by the image intensities $B_i^m$ of the average image. In general, the following is therefore obtained for the image intensity $B_i^{norm}(t)$ of a tissue region i in a normalized depiction of the examination subject.

$$B_i^{norm}(t)=B_i(t)/B_i^m=k_i \cdot (S_i^0+\Delta S_i(t))/(k_i \cdot S_i^m)=(S_i^0+\Delta S_i(t))/S_i^m; \quad (2)$$

wherein $(k_i \cdot S_i^m)$ designates the image intensity of the tissue region i in the average image and $S_i^m$ designates the average signal intensity of the tissue associated with this image intensity.

By means of this normalization, the influence of the weighting factors $k_i$ on the image intensity, which is different for each location in the tissue examined, is eliminated. The relative image intensities in the normalized images therefore are independent of influences of the detector coil, and in particular are independent of the distance between the detector coil and imaged tissue region.

During a perfusion measurement, only the course over time of a change in a tissue arising from the administration of a contrast agent is of interest. In order to determine the concentration and the distribution of a contrast agent in the tissue reliably, the influence of the surrounding tissue on the image intensity must be eliminated. This, in particular, also is a precondition for the detection of low contrast agent concentrations in the images of a measured sequence.

The contribution of the surrounding tissue to the image intensities $B_i^{norm}(t)$ is given as a time-independent intensity contribution $S_i^0$ in the depictions of a measured sequence. This intensity contribution can be considered as the background for detection of a contrast agent in the tissue. This background corresponds to the normalized average image.

In order to extract the intensity contribution $B_i^k(t)$ of the changes taking place during a measuring sequence in the tissue regions examined from the image intensities $B_i^{norm}(t)$, the contribution of the surrounding tissue must be subtracted from the image intensities $B_i^{norm}(t)$.

For a region i, therefore, the intensity $B_i^k$ arises in accordance with the following equation:

$$B_i^k(t) = B_i^{norm}(t) - 1 \qquad (3)$$
$$= (S_i^0 - S_i^m + \Delta Si(t))/S_i^m \Rightarrow B_i^k(t) \approx \Delta S_i(t)/S_i^m \text{ for } S_i^m \approx S_i^0$$

The image data corrected in accordance with equation (3) represent the changes caused by the contrast agent in the tissue under examination. The data corrected in this manner are particularly sensitive for allowing perfusion-induced tissue changes to be detected.

To the same extent, the images corrected in accordance with equation (3) form the starting basis of the simple creation of correcting signal-time curves, as illustrated in FIG. 3.

A signal-time curve reproduces, in a graphical illustration, the image intensities of selected tissue regions in the sequence of depictions of a measured sequence. Since each of the exposures was obtained at a specific time, the illustration therefore also reproduces the course over time of the image intensities for the selected tissue regions. The signal-time curves 31, 32, 33 and 34 illustrated in the signal-time graph 30 in FIG. 2 correspond to the course over time of the image intensities $B_i(t)$ of the tissue regions designated Region1, Region2, Region3 and Region4, and were created on the basis of a movement correction of the image data sets.

By contrast, the signal-time graph 40 of FIG. 3 reproduces the corrected signal-time curves 41, 42, 43 and 44 of the same tissue regions Region1, Region2, Region3 and Region4, but determined from the image data $B_i^k$ additionally normalized and corrected by background subtraction.

FIG. 3 clearly reveals that, while applying the correction method according to the invention, local influences on the signal values, such as the distance of a tissue region under examination from the detector coil, can be corrected and reliable assessment of the signal changes with one another is made possible.

On account of the greater distance to the detector coil, the increase in the image intensity for Region2, caused by the contrast agent, is considerably lower in the exclusively movement-corrected image data set than in one of the other three regions. This can be seen in FIG. 2 from the lower rise in the signal-time curve 32 as compared with the other signal-time curves 31, 33 and 34. As a result of the normalization, this local influence is compensated for, so that with the same contrast agent concentrations in all four regions, an identical increase in the image intensity of all four regions is achieved. As a result of the background subtraction, the signal-time curves are, moreover, directly comparable.

As a result of the perfusion measurement, presented as an example, it can be seen from FIG. 3 that no significant differences are present in the blood supply to the various myocardial regions Region1, Region2, Region3 and Region4.

Although the correction method according to the invention has been presented using the example of a perfusion measurement of the myocardium with a magnetic resonance tomography device, the method is applicable for all medical image diagnostic-measuring methods which measure a time-variable distribution or a time-variable concentration of a diagnostic preparation in tissues. The method according to the invention therefore also can be applied in lung or kidney perfusion measurements and in scintillography.

The method can be implemented as computer software for execution by a data processing system of an imaging measuring system or a data processing system independent of the measuring system. To this end, the computer software is loaded into a memory in the data processing system and executed by a processing unit thereof, for example the processor of the data processing system.

Although modifications and changes may be suggested by those skilled in the art, it is the intention of the inventor to embody within the patent warranted hereon all changes and modifications as reasonably and properly come within the scope of his contribution to the art.

I claim:

1. A method for correcting image data in a series of exposures obtained in a time sequence from an examination subject with a tomography apparatus, said image data including a first image dataset representing exposures in said sequence obtained from said examination subject before an occurrence of a diagnostically relevant event associated with said examination subject, and including a second image dataset representing exposures in said sequence obtained at or after the occurrence of said diagnostically relevant event, said method comprising the steps of:

making a first correction to said image data by displacing contents of the respective exposures represented by said image data to cause a position of said examination subject in the respective exposures to substantially coincide, thereby obtaining a corrected first image dataset and a corrected second image dataset;

making a second correction to said image data by forming an average image from said corrected first image dataset, and normalizing all exposures in said corrected first image dataset and said corrected second image dataset, image element-by-image element, to said average image, thereby obtaining normalized, corrected first image data; and making a third correction to said image data by identifying a value of at least one image element in a structurally uniform image region of an exposure in said normalized, corrected first image dataset, and subtracting said value of said at least one image element from respective values of each image element in said region in said first image dataset and said second image dataset.

2. A method as claimed in claim 1 wherein the step of identifying the value of at least one image element in a structurally uniform image region comprises forming an average value of a plurality of image elements in said structurally uniform image region.

3. A method as claimed in claim 1 comprising making said first correction to said image data by a correlation analysis.

4. A method as claimed in claim 1 wherein the step of forming said average image comprises conducting an averaging operation, selected from the group consisting of arithmetic averaging and quadratic averaging, image element-by-image element of a plurality exposures in said corrected image data.

5. A method as claimed in claim 1 wherein the step of forming said average image by averaging a selected number of exposures in said corrected image data having a noise component below a predetermined value.

6. A method as claimed in claim 1 wherein the step of forming said average image comprises selecting a number of exposures of said corrected image data having a change in said image contents, resulting from said first correction, below a predetermined value.

7. A method as claimed in claim 1 comprising obtaining said image data using a tomography system selected from the group consisting of magnetic resonance tomography systems and scintillography systems.

8. A tomography apparatus comprising:
 a magnetic resonance scanner, adapted to receive an examination subject for obtaining image data in a series of exposures in a time sequence from the examination subject, said image data including a first image dataset representing exposures in said sequence obtained from said examination subject before an occurrence of a diagnostically relevant event associated with the examination subject, and including a second image dataset representing exposures in said sequence obtained at or after the occurrence of said diagnostically relevant event; and
 an image processor supplied with said image data for making a first correction to said image data by displacing contents of the respective exposures represented by said image data to cause a position of said examination subject in the respective exposures to substantially coincide, thereby obtaining a corrected first image dataset and a corrected second image dataset, and for making a second correction to said image data by forming an average image from said corrected first image dataset, and normalizing all exposures in said corrected first image dataset and said corrected second image dataset, image element-by-image element, to said average image, thereby obtaining normalized, corrected first image data, and making a third correction to said image data by identifying a value of at least one image element in a structurally uniform image region of an exposure in said normalized, corrected first image dataset, and subtracting said value of said at least one image element from respective values of each image element in said region in said first image dataset and said second image dataset.

9. A computer readable medium encoded with a data structure stored in a memory accessible by a processor for correcting image data in a series of exposures obtained in a time sequence from an examination subject with a tomography apparatus, said image data including a first image dataset representing exposures in said sequence obtained from said examination subject before an occurrence of a diagnostically relevant event associated with said examination subject, and including a second image dataset representing exposures in said sequence obtained at or after the occurrence of said diagnostically relevant event, said data structure programming said processor to:
 make a first correction to said image data by displacing contents of the respective exposures represented by said image data to cause a position of said examination subject in the respective exposures to substantially coincide, thereby obtaining a corrected first image dataset and a corrected second image dataset;
 make a second correction to said image data by forming an average image from said corrected first image dataset, and normalizing all exposures in said corrected first image dataset and said corrected second image dataset, image element-by-image element, to said average image, thereby obtaining normalized, corrected first image data; and
 make a third correction to said image data by identifying a value of at least one image element in a structurally uniform image region of an exposure in said normalized, corrected first image dataset, and subtracting said value of said at least one image element from respective values of each image element in said region in said first image dataset and said second image dataset.

* * * * *